Jan. 3, 1967   R. E. HANSEN   3,296,113
GAS-STREAM MONITOR

Filed Oct. 15, 1963   6 Sheets-Sheet 1

INVENTOR.
ROBERT E. HANSEN
BY
ATTORNEY

Jan. 3, 1967  R. E. HANSEN  3,296,113
GAS-STREAM MONITOR

Filed Oct. 15, 1963  6 Sheets-Sheet 2

INVENTOR.
ROBERT E. HANSEN
BY
ATTORNEY

Jan. 3, 1967 R. E. HANSEN 3,296,113
GAS-STREAM MONITOR
Filed Oct. 15, 1963 6 Sheets-Sheet 4

INVENTOR.
ROBERT E. HANSEN
BY
ATTORNEY

INVENTOR.
ROBERT E. HANSEN

Jan. 3, 1967  R. E. HANSEN  3,296,113
GAS-STREAM MONITOR
Filed Oct. 15, 1963  6 Sheets-Sheet 6

INVENTOR.
ROBERT E. HANSEN
BY
ATTORNEY

United States Patent Office 3,296,113
Patented Jan. 3, 1967

3,296,113
GAS-STREAM MONITOR
Robert E. Hansen, Cleveland, Ohio, assignor to Union Carbide Corporation, a corporation of New York
Filed Oct. 15, 1963, Ser. No. 316,400
8 Claims. (Cl. 204—195)

This application is a continuation-in-part of my application U.S. Serial No. 204,818, "Gas-Stream Monitor" filed on June 25, 1962, now abandoned.

This invention relates to gas-stream analyzers. More particularly, this invention relates to a gas-stream analyzer particularly suited for monitoring the content of depolarizing gases.

Gas analysis methods employing combustion or chromatographic techniques are well known in the art. Similarly methods relying on physical properties of the gas-stream components for analytical purposes such as heat of reaction and paramagnetism measurements are widely used. Moreover, with methods such as these, expensive and bulky instrumentation is usually involved as well as attendant problems of selectivity in complex gas mixtures and adaptation to automatic control.

Still other gas analysis methods rely on electrochemical means involving depolarization of a galvanic cell electrode by the gas-stream component whose concentration is to be determined. While these latter methods afford advantages as far as compactness and portability of the apparatus are concerned, they are plagued by fluctuations of the electromotive force output of the galvanic cell. Such fluctuations may lead to erroneous readings.

Additional problems are encountered with the heretofore known electrochemical analysis methods with respect to stability and calibration of the measuring apparatus. Frequent calibration is usually required because of temperature variations, cell aging upon use and storage, and the like. Elaborate circuitry has been devised to minimize these difficulties but has met with limited success.

Furthermore, most of the aforementioned methods and devices are not equipped to monitor the full gas stream, merely to withdraw and analyze samples from the main stream.

In some fields of application it is extremely important, however, to provide a continuous monitoring system of the entire gas stream. For example, in diving units, space capsules, space suits, submarines, or similar closed-system environments, the available breathing gas supply must be continuously monitored. In such applications it is vital to have a stable and reliable monitoring system capable of rapid response to varying oxygen concentrations. Moreover, such a system must be selective to the component measured and be immune to wide temperature and pressure fluctuations.

The gas-stream monitor of the present invention is admirably suited for such applications. It has exhibited good overall reliability and speed of response at a wide range of pressures up to 150 p.s.i.g., and higher, without a marked decrease in sensitivity. In addition, it is compact and relatively inexpensive to manufacture.

Accordingly, it is the primary object of this invention to provide a compact gas-stream monitor having improved overall reliability.

It is another object to provide a gas analyzer, the sensitivity of which remains relatively constant throughout a wide range of operating pressures.

It is a further object to provide a compact gas analyzer insensitive to wide variations in gas flow rate through the analyzer.

It is a still further object to provide an oxygen monitor for continuous analysis of breathing gas supplied to closed-system environments.

These and other related objects will become readily apparent from the ensuing discussion and the appended claims.

The foregoing objects are accomplished by the gas-stream monitor of this invention which includes a galvanic sensing element comprising two gas-depolarizable electrochemical cells, said cells having porous carbon cathode elements which are exposed solely to the monitored gas stream and a reference gas stream, respectively. The cells are connected so as to electrically oppose each other, and the concentration of the monitored gas-component is shown by an indicating means electrically connected to both cells. Preferably, the porous carbon cathode elements are provided with a spinel catalyst which enhances the surface activity of the cathode.

The invention will now be described in greater detail with particular reference to the accompanying drawings in which.

Figure 1:
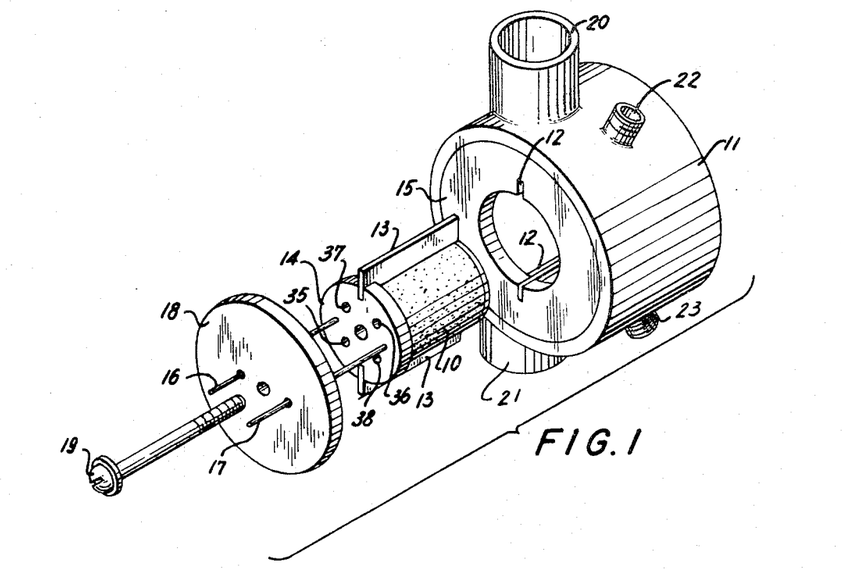
FIG. 1 is an exploded isometric view of a gas-stream monitor embodying the invention.

Referring now specifically to FIG. 1, a gas-stream monitor embodying the invention comprises a sensing element 10 which fits into the protective casing 11 along grooves 12 on dividers 13. The casing 11 can be permanently mounted in the gas supply line and only the sensing element 10 need be removed if replacement is desired. The face plate 14 of the sensing element 10 lies flush with the facing 15 of the casing 11 when in position. Anode terminals 16 and 17 of the cells of the sensing element through the face plate 14 and also through the retainer plate 18. The sensing element 10 is held within the casing 11 by the retainer plate 18 and the retainer screw 19. Main gas flow inlet is indicated by 20 and main gas flow outlet by 21. Similarly, the reference gas inlet is indicated by 22 and the outlet by 23. The reference gas outlet 23 is necessary in applications where a rapid change in environment pressure is encountered, for example, in diving operations. The outlet 23 is optional if the sensing element is operated at a substantially constant pressure.

Figure 2:
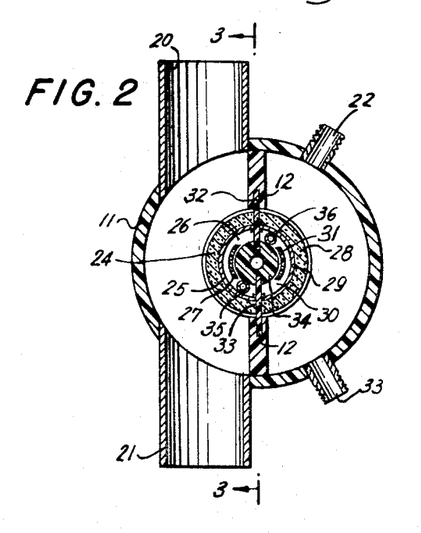
FIG. 2 is a cross-sectional elevation of the gas-stream monitor of FIG. 1.

FIG. 2 shows a cross-sectional elevation of two cells which may comprise the sensing element of the monitor of FIG. 1 when assembled. The oxygen-depolarizable cell in the main gas stream comprises a cathode 24, an electrolyte-permeable barrier 25, anode contained in the space 26, and an anode collector 27 to which is connected one of the anode terminals shown in FIG. 1. Similarly, the oxygen-depolarizable reference cell comprises a cathode 28, an electrolyte-permeable barrier 29, an anode contained in the space 30, and an anode collector 31 connected to the other anode terminal shown in FIG. 1. The two cells are separated by the partitions 32 and 33 and the central core 34. Tubes for filling the anode compartments 26 and 30 with electrolyte are indicated by 35 and 36. These filling tubes extend through the face plate 14 shown in FIG. 1. During filling, the anode compartments 26 and 30 are vented through openings 37 and 38 in the face plate 14. The openings 37 and 38 can also be utilized for introducing the particulate anode material into anode compartments 26 and 30, respectively, after the other structural parts and the cathodes are assembled.

Figure 3:
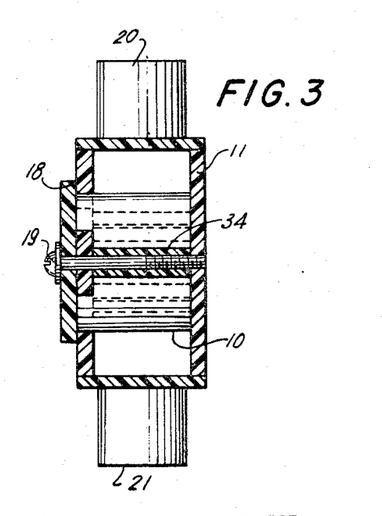
FIG. 3 is a side elevation of the gas-stream monitor of FIG. 1 taken along the line 3—3 in FIG. 2.

FIG. 3 shows a sectional side elevation of the gas-stream monitor taken along line 3—3 in FIG. 2. The sensing element 10 is shown contained in the casing 11, held in place by the retainer plate 18 and secured by the retainer screw 19 passing through the core 34 and anchored to the opposite wall of the casing 11.

Figure 4:
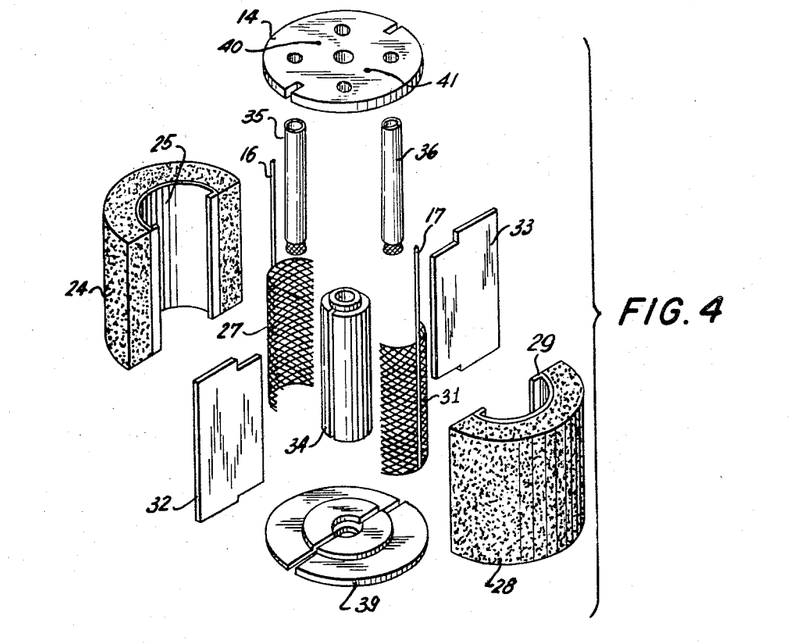
FIG. 4 is an exploded isometric view of a sensing element that can be employed in a gas-stream analyzer of this invention.

FIG. 4 shows an exploded isometric view of the sensing element 10. The element includes a bottom plate 39 provided with suitable grooves to receive partitions 32 and 33 and the central core 34. The cathodes 24 and 28 rest upon the bottom plate 39 and against the partitions 32 and 33. The inner wall of the cathodes is lined with electrolyte-permeable barriers 25 and 29, respectively. The anode collectors 27 and 31 are positioned in the spaces defined by the cathodes 24 and 28 and the central core 34 which spaces are the anode compartments 26 and 30 shown in FIG. 2. Anode terminals 16 and 17 are attached to their respective anode collectors and extend through the face plate 14 via openings 40 and 41. The filling tubes 35 and 36 extend in the anode compartments 26 and 30, respectively and extend through the face plate 14 which in turn fits over the top part of the assembly and retains the components in place.

Figure 5:
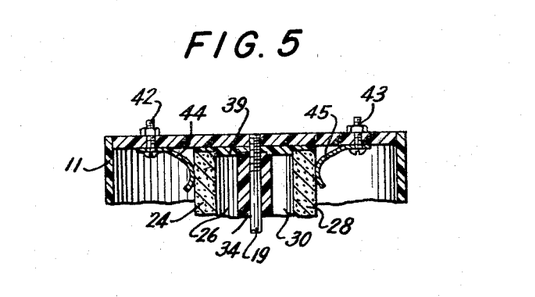
FIG. 5 is a fragmentary sectional view of a sensing element showing typical cathode terminal connections.

Typical cathode terminals are shown in FIG. 5 as 42 and 43 on the back side of casing 11. These terminals are electrically connected to the cathodes 24 and 28 through spring-like conductive members 44 and 45 resting against the cathodes.

Figure 6:
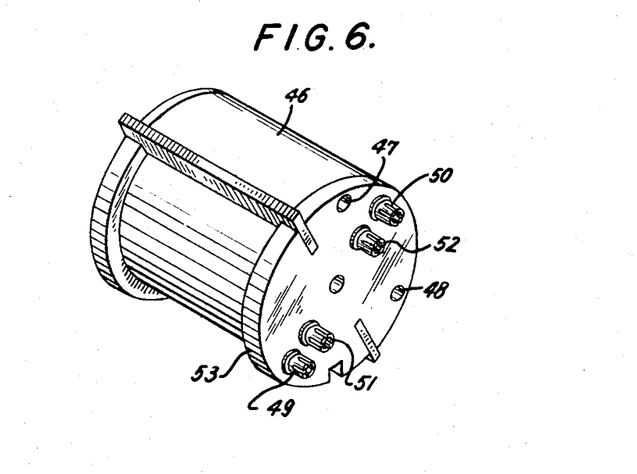
FIG. 6 is an isometric view of another sensing element that can be employed in a gas-stream analyzer of this invention.

FIG. 6 is an isometric view of another typical sensing element. In this particular embodiment a housing 46 is provided over the reference cell cathode and is situated in a spaced relationship therewith. The reference gas circulates in the space formed by the reference cell cathode and the housing. A reference gas inlet and a reference gas outlet are indicated by 47 and 48. Moreover, both the cathode terminals 49 and 50, and the anode terminals 51 and 52, extend through the bottom plate 53.

Figure 7:
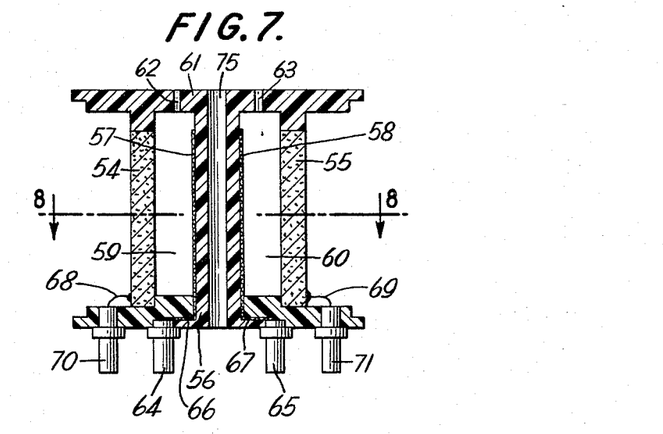
FIG. 7 shows a cross-sectional elevation of a sensing element of this invention which employs a flat cathode and a flat anode.

In FIG. 7 the sensing element comprises two flat carbon cathodes 54 and 55 supported on base 56 and spaced from flat, plate-type anodes 57 and 58, respectively. The electrolyte cavities 59 and 60 are defined thereby. These electrolyte cavities preferably extend somewhat past the respective cathode and the anode of the cell so as to provide a head space. Such a head space provides a location where gas bubbles within the electrolyte can migrate, and thus prevents the interference of these gas bubbles with the electrochemical reactions within the cell. A face plate 61 is provided over the cell as hereinabove described and completes the basic physical structure of the sensing element. Electrolyte vent holes in the face plate 61 are indicated by 62 and 63. The anode terminals 64 and 65 are connected to the anodes 57 and 58, respectively, by the respective anode collectors 66 and 67. Similarly, conductive leads 68 and 69 connect the cathodes 54 and 55 with the cathode terminals 70 and 71, respectively.

Figure 8:
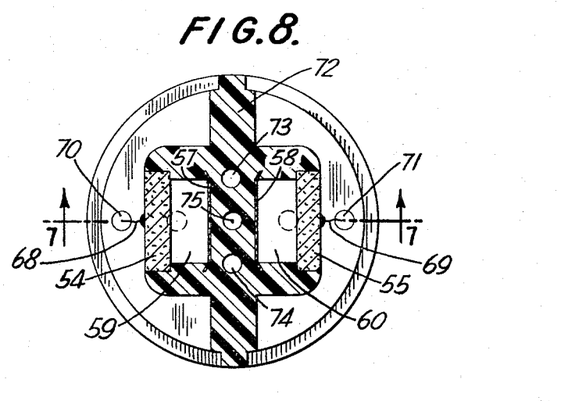
FIG. 8 shows a section of the sensing element of FIG. 7 taken along line 8—8.

As shown in FIG. 8, which is a section view of FIG. 7 along the line 8—8, the cathodes 54 and 55 and the anodes 57 and 58 are further supported by a casing 72. The electrolyte fill holes 73 and 74 communicate with the cavities 59 and 60, respectively, and provide means for introducing the electrolyte into the cells upon activation. A retainer screw for securing the sensing element within the gas analyzer of this invention passes through the hole 75.

It is to be noted that in all of the embodiments of the instant invention the carbon cathode is situated near the outer periphery of the cell and the sensing element so as to be exposed to the full gas stream which is to be monitored.

The oxygen sensor utilizes a galvanic sensing element which is a pair of primary cells comprising a porous carbon cathode which may be treated, if desired, with a spinel-type catalyst consisting of an oxide of a heavy metal and of aluminum oxide, a zinc or cadmium anode, and an electrolyte which can be either alkaline or acidic. Each cell operates from a separate source of oxygen. Depolarization of the carbon cathode is dependent on the diffusion of oxygen through the cathode to the electrolyte interface where an ionization reaction occurs.

The carbon cathode of one of the cells is exposed to the gas stream, the oxygen content of which is to be monitored, and the carbon cathode of the other is exposed to a reference gas stream of known oxygen content, usually a gas stream of substantially pure oxygen. Air can be used as the reference gas in some applications, if desired.

Thus each cell generates a voltage varying with the oxygen partial pressure of the gas to which the carbon cathode is exposed. The output of both of the cells is then compared by means of an electrical bridge circuit or the like which applies a certain electrical load to each cell.

The two cells preferably are made as much alike as possible to assure uniform operating characteristics under varying external conditions, i.e., temperature changes, barometric pressure changes, etc. The flat type carbon cathodes are preferred because of their uniformity and ease of manufacture.

The cathode electrode is the most important component of the oxygen sensor. The activation, porosity, etc. of the electrode govern the voltage sensitivity, and the wall thickness of the electrode is a factor in determining the response time. It is usually fabricated by extrusion in tubular form, or molded as a flat plate, followed by various heat and atmospheric treatments which produce the desired structure and electrochemical activity.

The cathodes used in the cells of the oxygen sensor of this invention are prepared from a mixture consisting of about 60 percent by weight of projector-type carbon, about 40 percent by weight of soft pitch and about 1½ percent by weight of fuel oil. If desired, suitable plastic binders may be substituted for the pitch and fuel oil and the amount of binder adjusted accordingly. Cathodes having the desired dimensions are extruded or molded from such a mix and baked at 1000° C. for about 6 hours. After this baking the cathodes have a porosity of between 20 and 33 percent, using water saturation method measurement. The cathodes are next heated in a $CO_2$ atmosphere between 850° C. to 950° C. for two hours to convert their hard and shiny skin to a surface having a dark black appearance. In this condition the carbon cathodes are better able to absorb the catalyzing solution in which they will be immersed. Such a solution consists of an 0.1 molar solution of aluminum nitrate and cobalt nitrate containing 75 grams $Al(NO_3)_3 \cdot 9H_2O$ and 29 grams $Co(NO_3)_2 \cdot 6H_2O$ per liter. Generally one carbon cathode of approximately 10 square centimeter surface area requires about 1.5 ml. of solution. Best results have been obtained by placing the carbon dioxide-treated carbon cathodes, once cooled, in a container which is then evacuated. After obtaining a vacuum of about 20 millimeters of mercury, the catalyzing solution is allowed to enter the container, and to soak the electrodes. Upon restoring the air pressure, the solution is pressed into the pores of the electrodes. The cathodes are then dried at about 100° C. for two hours, and heated again to about 850° C. for two hours in carbon dioxide to decompose the metal nitrates to oxides. After this treatment a spinel of the formula $CoO \cdot Al_2O_3$ is formed from the catalyst mixture. The deposit is observable on the surface of the carbon cathodes as a blue deposit. After cooling the carbon cathodes in a carbon dioxide atmosphere, the vacuum operating and heating cycles are repeated to increase the activity of the carbon surface. In some instances the spinel catalyst may be omitted, provided the electrode surface area is properly developed.

Optionally, the cathodes can be further treated with a noble metal catalyst such as platinum. This can be accomplished by painting on the carbon cathode surface an aqueous solution containing about 10 percent of chloroplatinic acid ($H_2PtCl_6 \cdot 6H_2O$). This compound, when deposited on the cathode surface, is thermally decomposed by conventional methods so as to yield a catalytically active noble metal. The noble metal catalyst is deposited on the cathodes when it is desired to increase the voltage and load capability of the cell. The amount employed is dependent on the desired output characteristics of the cell.

For best results, the carbon cathodes should be wet-proofed. This can be achieved by immersing the electrodes in a paraffin-petroleum ether solution (the paraffin concentration can be as high as about 2 weight percent, or as low as about 0.5 weight percent) for about five minutes. Following this, the electrodes are air-dried. Wet-proofing aids in reducing polarization of the electrode, but too much wet-proofing is detrimental to electrode life, in that it adversely affects the load capability of the cell by decreasing the available electrode surface area.

Other wet-proofing agents can be used in addition to paraffin and petroleum ether. Thus chloronaphthalene and dibenzylether may be used.

The two cathode electrodes for a given sensor are obtained by cutting off a predetermined length of the extruded carbon tube or molded plate subjected to the aforementioned treatment. In the case of tubular electrodes, the extruded portion is split longitudinally thereby obtaining two nearly identical semi-annular electrodes.

The anode can be zinc, cadmium, or the like, either particulate in form or a flat plate. A particulate anode normally is made from a mixture of amalgamated zinc powder or cadmium powder, sodium carboxymethylcellulose (CMC) and water. The mixture is dried and reduced to small granules. The CMC is used to prevent oxidation of the zinc powder. Moreover, when the granules are wet with the electrolyte in the sensing element, the CMC forms a gel which immobilizes the electrolyte thus enabling operation of the sensing element in any position.

The service capacity of the sensing element, in terms of hours of operation, is determined by the amount of zinc present in the anode. For example, for an operation period of about eight hours at a current of about 10 milliamperes for a typical element, about 0.1 gram of zinc is required; however, at least a ten fold excess of zinc is normally used in order to insure constant discharge characteristics.

The sensing element is activated just prior to use by pouring the electrolyte through the fill holes into the electrolyte cavity so as to contact the anode. The electrolyte passes through the filling tubes to the bottom and wets the anode from the bottom upward. In this manner the electrolyte displaces air upward and out through the air vent. After filling, the openings are sealed, the sensing element is secured within the casing and the necessary electrical connections are made.

Activation may also be carried out as soon as the element is assembled; subsequent to the activation the element being stored in an air-tight container or bag until used. However, for reasons of convenience, the afore-described activation method is preferred.

As set forth above, the electrolyte can be either acidic or alkaline, and can be a liquid or a gel. Typical electrolytes are aqueous solutions of potassium hydroxide, sodium hydroxide, ammonium chloride, zinc chloride, and the like. The particular electrolyte concentration is dependent on the conductivity and the activity desired. Normally the concentration of alkaline electrolytes is in the range from about 6 N to about 12 N. For acid electrolytes, the pH of the electrolyte may range from about 2 to about 6.

Alkaline electrolytes can be advantageously employed in instances where carbon dioxide contamination is not a problem; however acidic electrolytes are often preferred because cells employing an acidic electrolyte are substantially less sensitive to carbon dioxide. Moreover, these cells are about twice as sensitive to changes in oxygen concentration as compared to those employing alkaline electrolytes. The response time of an acidic cell is somewhat greater than that of an alkaline cell, yet in both instances the response times are satisfactory for many uses.

A particularly preferred electrolyte is an acidified aqueous zinc chloride solution gelled with corn starch, polyalkylene oxide, or the like. Such an electrolyte can be prepared by constituting two solutions as follows:

| Solution A: | Amount, Parts by Wt. |
|---|---|
| Distilled water | 250 |
| Zinc chloride (dry) | 125 |
| Mercuric chloride | 2.5 |
| Hydrochloric acid (conc.) | about 1 drop |
| Distilled water | 250 |
| Corn starch | 37 |

Equal volumes of soluions A and B are then combined and the resulting solution heated at about 100° C. until a gel is obtained. The electrolyte thus obtained then is ready for use.

Figure 9:
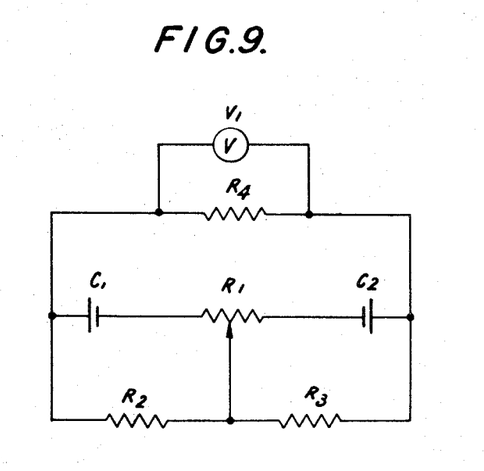
FIG. 9 is a diagrammatical view of a typical circuit suitable for use with the gas-analyzer of this invention.

A typical indicating circuit for the gas-stream monitor of the instant invention is shown in FIG. 9. A reference cell C1 is connected to a measuring cell C2 through a potentiometer R1 in such manner that the electromotive forces of the cells oppose each other. In addition, a fixed-load resistance R2 is connected into the circuit across the reference cell C1 and through the potentiometer R1. Similarly, another fixed-load resistance R3 is connected across the measuring cell C2 through the potentiometer R1. A fixed resistance R4 is connected across cell C1, the potentiometer R1, and cell C2.

When the gas-stream monitor is standardized, cathodes of both cells are exposed to oxygen-containing gas streams having the same oxygen concentration. Preferably pure oxygen gas is employed for this purpose. Upon exposure to the oxygen-containing gas the cells generate electromotive force and set up a current flow in the circuit. The circuit is balanced by suitably adjusting the potentiometer R1 to give no current flow through the resistance R4. This condition can be conveniently ascertained by measuring the voltage drop across the resistance R4 by a voltmeter V1. When the circuit is in balance there is no voltage drop across the resistance R4.

The voltmeter indications then can be calibrated for direct readout by exposing the measuring cell to gas samples of known oxygen concentrations while maintaining the reference cell exposed to a reference gas having a constant oxygen concentration. The reference gas is preferably the same as that employed for standardization of the cells.

Figure 10:
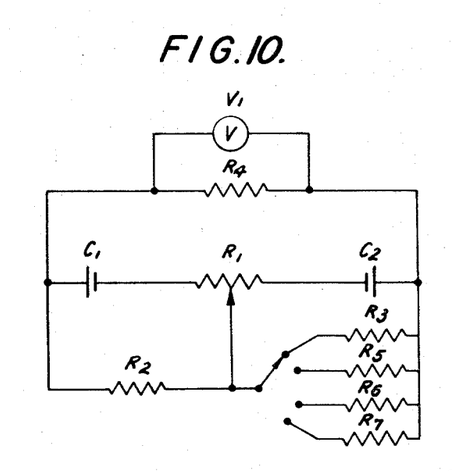
FIG. 10 shows another similar circuit employing multiple-set points.

Another exemplary indicating circuit is shown by FIG. 10. Basically the circuit is the same as that of FIG. 9 having additional fixed-load resistances R5, R6 and R7 provided for the measuring cell C2. With this added proviso and with a suitable choice of resistance values for the fixed-load resistances, the circuit can be standardized with a gas having one oxygen concentration, and the zero-balance point adjusted for gases having different oxygen concentrations without the need of additional standardization. For example, in a typical circuit

R1=3Ω  R5=300Ω
R2=250Ω  R6=355Ω
R3=250Ω  R7=390Ω the circuit may be balanced using 100% oxygen when the fixed-load resistance R3 is in the circuit. Subsequently the zero-balance point may be adjusted for a gas containing 60% $O_2$ by switching to the 300Ω resistance, for a gas containing 40% $O_2$ by switching to 355Ω resistance, and for a gas containing 32.5% $O_2$ by switching to the 390Ω resistance, in the circuit.

Voltage-measuring circuits can also be adapted so as to measure current by suitably placing an ammeter in the circuit. A voltmeter is employed in the circuit to establish a zero potential difference between the two cells. The ammeter reading then indicates the oxygen concentration of the gas. It is preferred to measure the current in the circuit when the voltage output signal of the sensing element is low, for example, at low oxygen concentrations in the gas stream.

Figure 11:
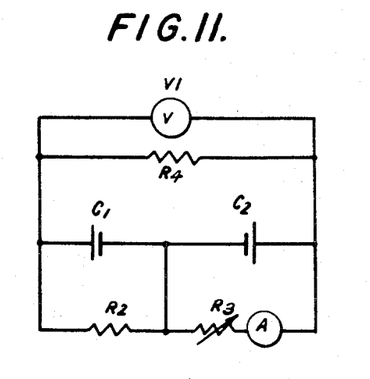
FIG. 11 shows still another typical circuit suitable for use with the gas-analyzer of this invention.

A typical current-reading circuit is shown in FIG. 11. A reference cell C1 is connected through its cathode to the cathode of the measuring cell C2. A fixed-load resistance R2 is connected across the reference cell C1 and a variable-load resistance R3 is connected across the measuring cell C2. A voltmeter V1 is connected across both cells C1 and C2 and is employed during standardization of the measuring device, i.e., when the circuit is balanced by suitably adjusting the variable load resistance R3 while the cathodes of both cells are exposed to a gas-stream having the same oxygen concentration. An ammeter A is connected into the circuit between the variable load resistance R3 and the measuring cell C2 and is set to a reference point during calibration. During use, the voltmeter V1 is employed to establish a zero potential difference between the two cells so that the oxygen concentration of the gas stream to which the measuring cell cathode is exposed is indicated by the ammeter deflection. Optionally a fixed-load resistance R4 can be provided across the cells C1 and C2. For many uses, it may be desirable to omit the ammeter from the circuit in FIG. 11 and employ the circuit for voltage measurement.

Still other measuring circuits may be employed, if desired. In some instances it may even be desirable to amplify the sensing element output signals by means of a suitable amplifier. A representative unit of this latter type determines the true voltage output of the cells by periodically loading the cells in synchronism with a chopper-type amplifier which responds to the no-load voltage of the cells and produces a direct current output.

Figure 12:
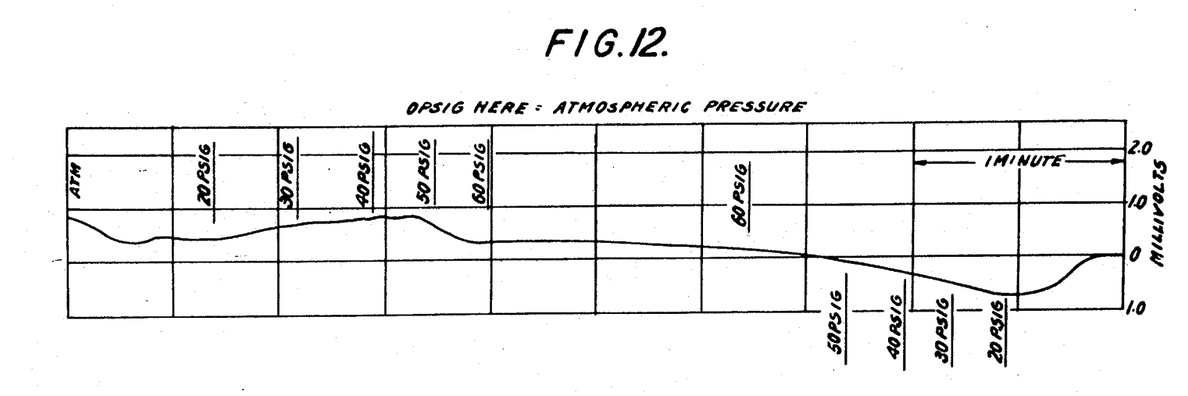
FIG. 12 is a graphical presentation illustrating the zero-stability of the sensing element at varying pressures when the anode compartments of the cells are not vented.
Figure 13:
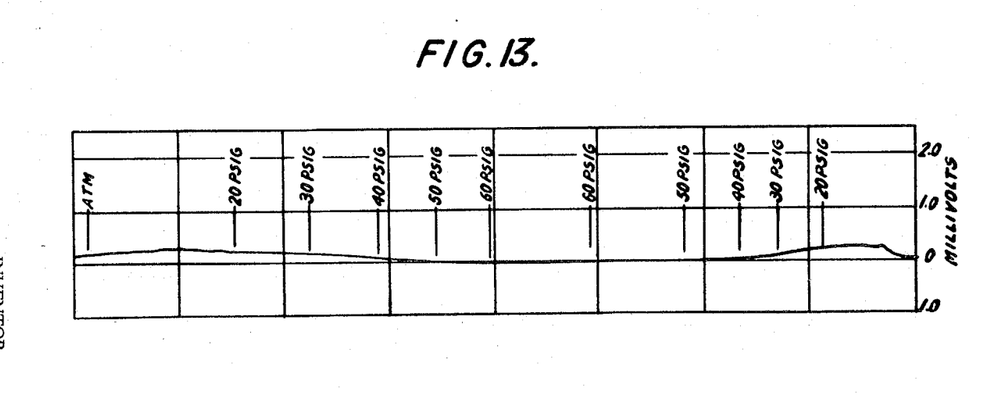
FIG. 13 is a graphical presentation illustrating the zero-stability of the sensing element at varying pressure when the anode compartments of the cells are vented.

Furthermore, it has been found that optimum zero stability at varying gas pressures can be achieved by venting the anode compartment of the cells to the main gas stream or the like so as to equalize the pressure. This is illustrated by FIGS. 12 and 13. FIG. 12 shows the zero stability of the gas-stream monitor of this invention having no venting means for the anode compartments. It is noted that, with such an arrangement which is still satisfactory for some uses, the balance point tends to drift at varying gas pressures. On the other hand, an extremely stable zero balance is indicated under similar operating conditions in FIG. 13 for a gas-stream monitor provided with venting means for the anode compartments. The venting can be conveniently achieved by providing a vent hole in the seals for the electrolyte fill openings 35 and 36 or in the seals for the anode filling holes 37 and 38 shown in FIG. 1.

The oxygen monitors of this invention have been subjected to exhaustive performance tests. The following are representative of typical results.

*Voltage sensitivity*

Sufficient sensitivity was indicated to determine the oxygen concentration to within ±2 percent in the range of from about 20% to 100% $O_2$ in an oxygen-inert gas mixture.

The sensitivity was the same with either KOH or NaOH as the electrolyte.

No change in sensitivity was noted at varying gas flow rates in the range from about 4 and lower to about 24 liters per minute. Similarly, varying humidity of the gas stream did not produce discernible differences in sensitivity as compared to a dry gas stream of the same composition.

Moreover, even gross wetting of the element by spraying water on the cell cathode did not affect the sensitivity.

The effect of changing resistance load on sensitivity when using an alkaline electrolyte is shown in Table I.

TABLE I.—EFFECT OF CHANGING RESISTANCE LOAD (CURRENT DRAIN) ON SENSITIVITY

| Pressure, p.s.i.g. | R2, ohms | R4, ohms | Output Voltage, millivolts | | | |
|---|---|---|---|---|---|---|
| | | | 100% $O_2$ | 60% $O_2$ | 40% $O_2$ | 20% $O_2$ |
| Atm | 1,000 | 1,000 | 00.0 | 5.6 | 10.2 | 18.0 |
| Atm | 500 | 1,000 | 00.0 | 5.7 | 10.4 | 18.3 |
| Atm | 250 | 1,000 | 00.0 | 5.7 | 10.4 | 18.3 |
| Atm | 150 | 1,000 | 00.0 | 5.9 | 10.6 | 18.7 |

R3 adjusted to give zero millivolt output at 100% $O_2$.
Reference Cell—100% $O_2$ at 2 liters per minute.
Sensing Cell—Gas Flow of 4 liters per minute.

From the above results it can be seen that changes in current drain of the cell have very little effect, if any, on sensitivity as measured by voltage sensing devices.

Table II shows the effect of pressure on sensitivity with an alkaline cell.

TABLE II.—EFFECT OF PRESSURE ON SENSITIVITY

| Pressure, p.s.i.g. | R2, ohms | R4, ohms | Output Voltage, millivolts | | | |
|---|---|---|---|---|---|---|
| | | | 100% $O_2$ | 60% $O_2$ | 40% $O_2$ | 20% $O_2$ |
| Atm | 250 | 1,000 | 00.0 | 5.7 | 10.4 | 18.3 |
| 50 | 250 | 1,000 | 00.0 | 5.7 | 10.5 | 18.3 |
| 100 | 250 | 1,000 | 00.0 | 5.7 | 10.4 | 18.4 |
| 150 | 250 | 1,000 | 00.0 | 5.7 | 10.5 | 18.3 |

R3 adjusted to give zero millivolt output at 100% $O_2$.
Reference Cell—100% $O_2$ at 2 liters per minute.
Sensing Cell—Gas Flow of 4 liters per minute.

It is readily apparent that sensitivity of the sensing element is not a function of the total pressure, but rather, it is a function only of partial pressure of the depolarizer gas.

The data in Tables I and II were obtained employing a measuring circuit similar to that shown in FIG. 11. The only difference was that an ammeter was not provided in the circuit.

*Response time*

Response time of the element increases somewhat with increasing gas pressure (e.g., for alkaline cells, 15 seconds at atmospheric pressure, 90 seconds at 150 p.s.i.g. for ⅔ of final indication in millivolts); however, these response times are considered acceptable for many uses.

Response time is not affected by changes in the gas flow rate; however, the response time when an acid electrolyte is employed increases somewhat as compared to that when an alkaline electrolyte is employed.

Effect of $CO_2$ contamination

The effect of carbon dioxide was tested by comparing oxygen-inert gas mixtures against the same mixtures with the addition of 0.25%, 0.50%, 1.00%, or 2.00% of $CO_2$. The gas mixtures were obtained premixed in tanks to insure accuracy. The adverse effect of $CO_2$ manifests itself as unstable output voltage.

For sensing elements containing KOH electrolyte the critical $CO_2$ content was found to be between 0.5 and 1.0 percent. With aqueous NaOH solution as the electrolyte the critical $CO_2$ content for breathing atmosphere control was found to be between about 1.0 and 2.0 percent.

The carbon dioxide contamination disadvantages can, of course, be obviated by the use of an acidic electrolyte.

The results of actual diving tests employing the oxygen monitors of the present invention are compiled below as Table III.

TABLE III

| Duration of Test, min. | Depth of Dive, ft. | Percent $O_2$ in Breathing Gas (He-$O_2$) | Diving Tests | | Electrolyte | Remarks |
| --- | --- | --- | --- | --- | --- | --- |
| | | | Start-Finish Deviation, percent | Carbon Cathode Type | | |
| 60  | 30  | 32 | +1 | Flat plate | Gelled $ZnCl_2$ | |
| 36  | 30  | 30 | −2 | ...do...   | KOH            | |
| 60  | 30  | 32 | −3 | ...do...   | Gelled $ZnCl_2$ | |
| 35  | 30  | 30 | −5 | ...do...   | KOH            | |
| 30  | 160 | 30 | +4 | ...do...   | Gelled $ZnCl_2$ | 5 min. at max. depth. |
| 60  | 30  | 30 | −8 | ...do...   | KOH            | |
| 165 | 30  | 30 | 0  | ...do...   | Gelled $ZnCl_2$ | |
| 73  | 30  | 60 | −1 | ...do...   | Gelled $ZnCl_2$ | |

The data in the foregoing table indicate that optimum overall performance in the presence of carbon dioxide is obtained when an acidic electrolyte such as gelled zinc chloride is employed in combination with a flat plate type carbon cathode. Under testing conditions where the carbon dioxide concentration exceeded permissible limits, the alkaline cells exhibited undesirable deviation.

While the foregoing discussion has been directed primarily to a device for monitoring the oxygen concentration of a gas stream, the present device is equally well suited for monitoring the content of the other gases exerting a reproducible depolarizing action on carbon cathodes. Such gases are chlorine, the nitrogen oxides, and the like.

The foregoing discussion is intended to be merely illustrative and is not to be interpreted as limiting. Many changes in the details of construction and the arrangement of parts may be resorted to without departure from the scope and spirit of this invention.

I claim:
1. Gas monitor comprising, in combination, a casing provided with main gas inlet and outlet ports and a reference gas inlet port; a galvanic sensing element disposed within the casing and including two electrochemical cells electrically connected so as to oppose each other and each having a gas-depolarizable, porous carbon cathode situated within the casing in spaced relation thereto so as to form two independent gas passageways, one of which communicates between said main gas inlet and outlet ports and the other of which communicates with said reference gas inlet, said gas passageways being so arranged and disposed around the cathode of each one of the cells as to expose the cathode of one of the cells solely to the full flow of main gas through one passageway and the cathode of the other cell solely to the full flow of reference gas through the other passageway; and a means indicating the electrical output of the opposed cells.

2. Oxygen monitor comprising, in combination, a casing provided with main gas inlet and outlet ports and a reference gas inlet port; a galvanic sensing element disposed within the casing and including two electrochemical cells electrically connected so as to oppose each other and each having a semi-annular, oxygen-depolarizable, porous carbon cathode situated at the outer periphery of the cell so as to form at least a part of the outer shell thereof, the cathode containing a spinel-type catalyst consisting of an oxide of a heavy metal and of aluminum oxide, an electrolyte-permeable separator coextensive with the inner wall of the cathode, a particulate anode contained adjacent to the separator and an electrolyte admixed with the particulate anode and wetting the cathode through the separator; a partition disposed within the casing and between the two electrochemical cells dividing the space defined by the casing into two independent gas passageways, one of which communicates between said main gas inlet and outlet ports and the other of which communicates with said reference gas inlet, said gas passageways being so arranged and disposed around the cathode of each one of the cells as to expose the cathode of one of the cells solely to the full flow of main gas through one passageway and the cathode of the other cell solely to the full flow of reference gas through the other passageway; and means indicating the electrical output of the opposed cells.

3. The oxygen monitor of claim 2 wherein the spinel-type catalyst has the formula $CoO \cdot Al_2O_3$.

4. Oxygen monitor comprising, in combination, a casing provided with main gas inlet and outlet ports and a reference gas inlet port; a galvanic sensing element disposed within the casing and including two electrochemical cells electrically connected so as to oppose each other and each having a flat, oxygen-depolarizable, porous carbon cathode situated at the outer periphery of the cell so as to form at least part of the outer shell thereof, the cathode containing a spinel-type catalyst consisting of an oxide of a heavy metal and of aluminum oxide, a flat, plate-type anode juxtaposed with respect to the cathode and an electrolyte contained between the cathode and the anode and wetting both the cathode and the anode; a partition disposed within the casing and between the two electrochemical cells dividing the space defined by the casing into two independent gas passageways, one of which communicates between said main gas inlet and outlet ports and the other of which communicates with said reference gas inlet, said gas passageways being so arranged and disposed around the cathode of each one of the cells as to expose the cathode of one of the cells solely to the full flow of main gas through one passageway and the cathode of the other cell solely to the full flow of reference gas through the other passageway; and means indicating the electrical output of the opposed cells.

5. The oxygen monitor of claim 4 wherein the spinel-type catalyst has the formula $CoO \cdot Al_2O_3$.

6. The oxygen monitor of claim 2 wherein the anode is zinc grandules and the electrolyte is an aqueous solution of potassium hydroxide.

7. The oxygen monitor of claim 4 wherein the carbon cathode is coated with a noble metal catalyst.

8. The oxygen monitor of claim 4 wherein the anode is a zinc plate and the electrolyte is acidified zinc chloride solution gelled with starch.

References Cited by the Examiner

UNITED STATES PATENTS

| | | | |
|---|---|---|---|
| 819,355 | 5/1906 | Leeds et al. | 324—98 |
| 2,616,950 | 11/1952 | Terpstra | 204—195 |
| 2,722,658 | 11/1955 | Richards | 204—195 |
| 2,758,079 | 8/1956 | Eckfeldt | 204—195 |
| 2,851,654 | 9/1958 | Haddad | 204—195 |
| 2,938,064 | 5/1960 | Kordesch | 136—86 |
| 2,980,749 | 4/1961 | Broers | 136—86 |
| 2,991,412 | 7/1961 | Kordesch | 324—29 |
| 3,060,374 | 10/1962 | Strain | 324—98 |

JOHN H. MACK, *Primary Examiner.*

HOWARD S. WILLIAMS, *Examiner.*

T. TUNG, *Assistant Examiner.*